United States Patent

[11] 3,617,876

| [72] | Inventor | Daniel E. Robinson<br>Metuchen, N.J. |
|------|----------|--------------------------------------|
| [21] | Appl. No. | 860,258 |
| [22] | Filed | Sept. 23, 1969 |
| [45] | Patented | Nov. 2, 1971 |
| [73] | Assignee | General Cable Corporation<br>New York, N.Y. |

[54] MOLD ELECTRICAL TESTER FOR MOLDED CORDS
14 Claims, 4 Drawing Figs.

[52] U.S. Cl. .................................................. 324/51,
18/36, 29/593, 249/97
[51] Int. Cl. .................................................. B22d 19/04,
G01r 31/02
[50] Field of Search .......................................... 324/51, 66;
249/91, 95–97; 18/36, 2 HA; 29/593, 629;
339/218

[56] References Cited
UNITED STATES PATENTS

| 2,500,546 | 3/1950 | Judisch .......................... | 249/97 |
| 2,548,991 | 4/1951 | McNabb ........................ | 324/51 |

Primary Examiner—Gerard R. Strecker
Attorney—Sandoe, Hopgood & Calimafde

ABSTRACT: This mold for the terminations of electrical cords and harnesses has electrically conductive walls of the mold insulated from electrically conductive walls of holders for prongs or sockets of the mold termination; and the holders for the different prongs and sockets are insulated from one another. Conductors from these insulated walls lead to a fault detector which indicates defects such as open circuits, short circuits, crosses or "whiskers" in the cord or harness at the completion of the molding operation, thus providing an automatic test and eliminating the usual separate testing step in the manufacture of electrical cords and harnesses.

INVENTOR
Daniel E. Robinson
BY
ATTORNEYS

INVENTOR
Daniel E. Robinson
BY Sandoe, Hopgood & Calimafde
ATTORNEYS

MOLD ELECTRICAL TESTER FOR MOLDED CORDS

BACKGROUND AND SUMMARY OF THE INVENTION

Described herein is an insulated mold for electrical testing of molded cords during molding operation.

The testing of cords and harnesses comprising multiconductor cables having molded terminations is expensive and subject to errors. The testing is expensive since the cords are usually low-cost items and the additional labor of testing becomes an appreciable part of the overall cost. This is especially true since most of the production is automatic. The normal manual testing by an operator is subject to errors since sometimes the conductor has been broken inside but makes contacts due to shrinking during cooling off of the molding compound, as well as sometimes short circuits exist but separate due to the same type of change. These faults are not always picked up. A third and very important condition exists, called "whiskers," in which ends of multistrand conductors stick out through the molded termination. This condition may escape detection by the operator, since it is difficult to provide an electrode which completely covers the molded termination. The mold itself serves as this electrode and provides intimate coverage of the entire termination without shorting out to the attached prongs, sockets, etc.

This test is necessary to insure that no ungrounded conductor can contact the cord user, thus preventing a dangerous health hazard. This means of testing is also necessary for completely automated production, in which testing inspection occurs during the production operation as an integral part of it. A further and most important feature of this invention is the fact that the device allows the test to be performed during the whole process of molding production and any fault is brought to the attention of the operator the instant it occurs, such that:

1. That part of the procedure causing the fault can be detected.
2. The molded parts are under tension and the broken strand will be detected when separated.
3. Same as (2) except shorts are in contact and will be detected.

This invention relates to devices providing for electrical testing of cords, multiline wire, cables, etc., having molded connectors, parts or sections during the molding operation process. The device is particularly suited for detecting open circuits, short circuits, crosses and whiskers in cords and multiconductor cables having molded-on connectors.

This device is an insulated mold with electrodes providing means for electrically connecting the various conductors as well as connection to a surrounding grounding chamber.

The device is designed so that each prong, socket, lead, etc., component which is to be molded into a cable is held in place by an isolated section of the mold which also acts as an electrode.

The isolated sections are constructed of the same material as a normal mold except for a thin strip, section or coating of high-temperature dielectric insulation around each prong, etc., component.

Contact to the electrode is made by either a metallic spring-loaded construction or connected directly to the isolated mold section in such cases where the prong, socket, etc., provided the spring force necessary to make good electrical contact.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
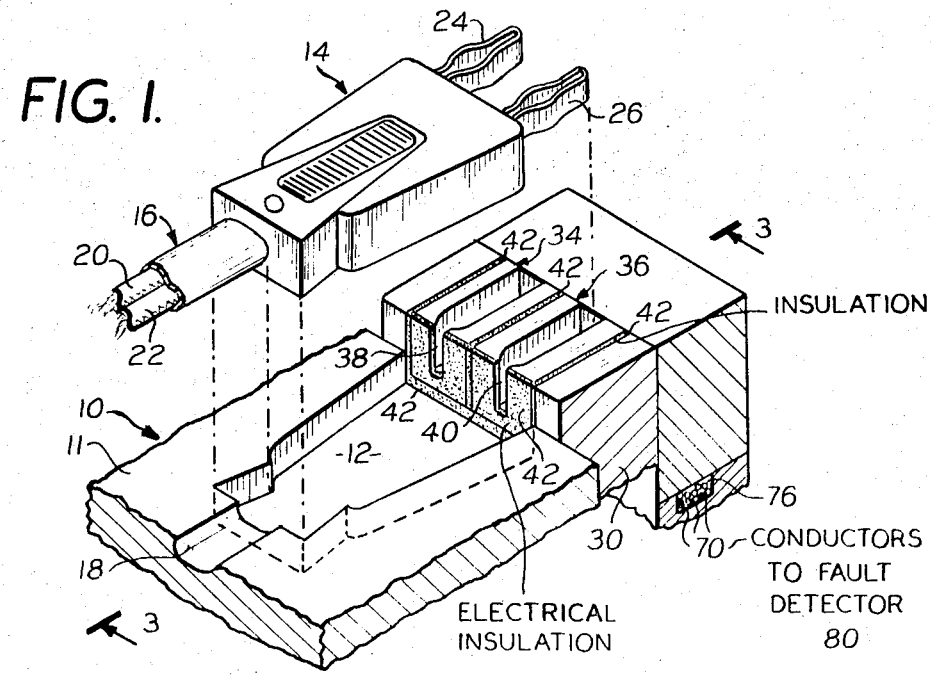
FIG. 1 is a diagrammatic, exploded view showing a part of a mold of this invention and showing the way in which the electrical cord termination and termination prongs fit into the mold and its associated electrodes.

FIG. 1 shows a mold 10 having a fixed portion 11 with a cavity 12 for molding a termination 14 on a multiconductor cable 16. The cable 16 enters the mold cavity 12 through an opening 18 which holds the cable centered. The cable 16, illustrated in the drawing, has two multistrand conductors 20 and 22 which are connected with connector elements 24 and 26, respectively, in a manner well understood in the art.

The connector elements 24 and 26 are shown in the drawing as having prongs which extend beyond the end of the termination plug 14, but it will understood that the invention can be used, with obvious modifications, for molding and testing terminations which have conductor elements that form sockets in the termination plug for receiving complementary prongs of a termination of another cord.

At one end of the mold cavity 12 there is a frame 30 which has depressions in it for receiving holders 34 and 36 into which the connector elements 24 and 26 extend and by which these connector elements are secured in place during a molding operation. The connector elements 24 and 26 extend into slots 38 and 40 in the holders 34 and 36, respectively, and each slot 38 and 40 is preferably of substantially the same height as the connector element 24 or 26 which extends into it.

The holders 34 and 36 are made of electrically conductive material and function as slotted electrodes for connecting the connector elements 24 and 26 with circuits leading to a fault detector, as will be more fully explained.

Each of the holders 34 and 36 is insulated from all other holders of the apparatus and from the frame 30 and from the mold 10 by electrical insulation 42.

Figure 2:
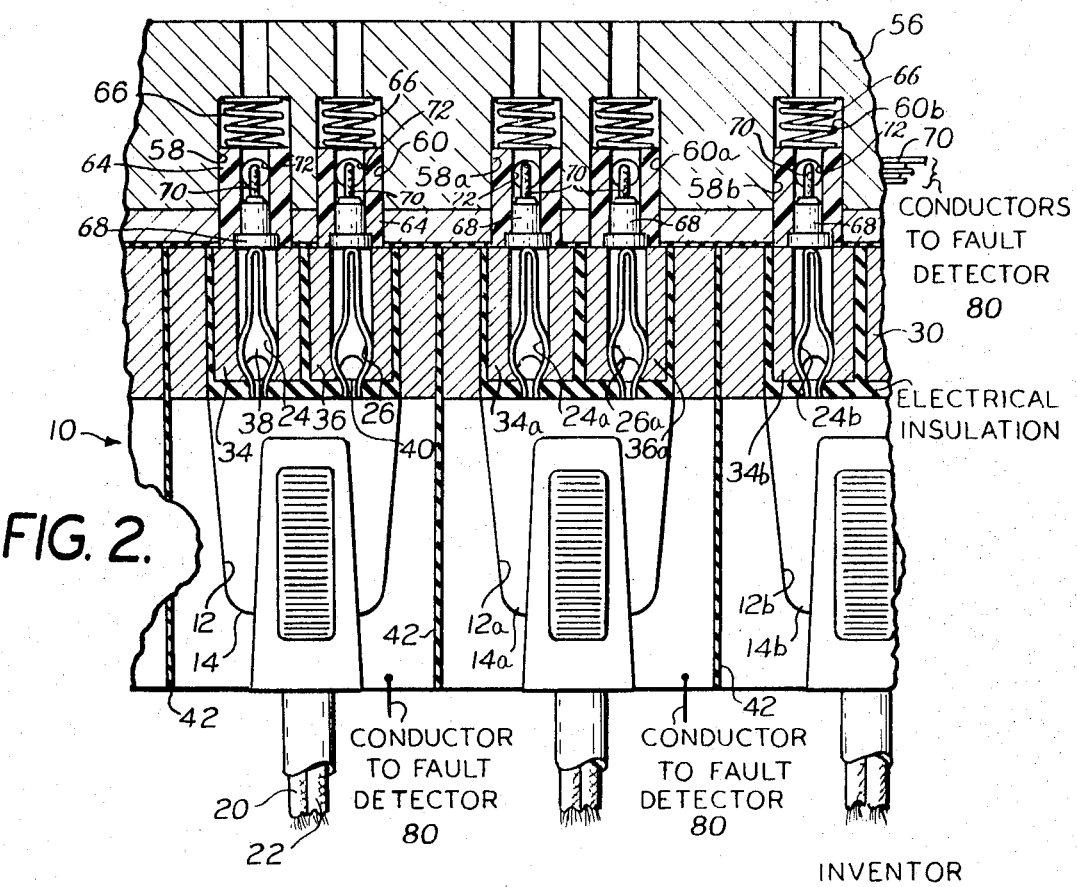
FIG. 2 is a sectional view showing the electrodes for a multicavity mold and showing a housing on the sides of the electrode opposite the mold with contacts for connecting the prongs of the terminations with a fault detector, the section being taken on the line 2–2 of FIG. 3.

When the invention is used commercially, it is preferably used with a multicavity mold so as to obtain high production. FIG. 2 shows the frame 30 with the holders 34 and 36 and with corresponding holders 34 and 36 and with corresponding holders for other cavities indicated by the same reference characters with a letter "a" or "b" appended.

Figure 3:
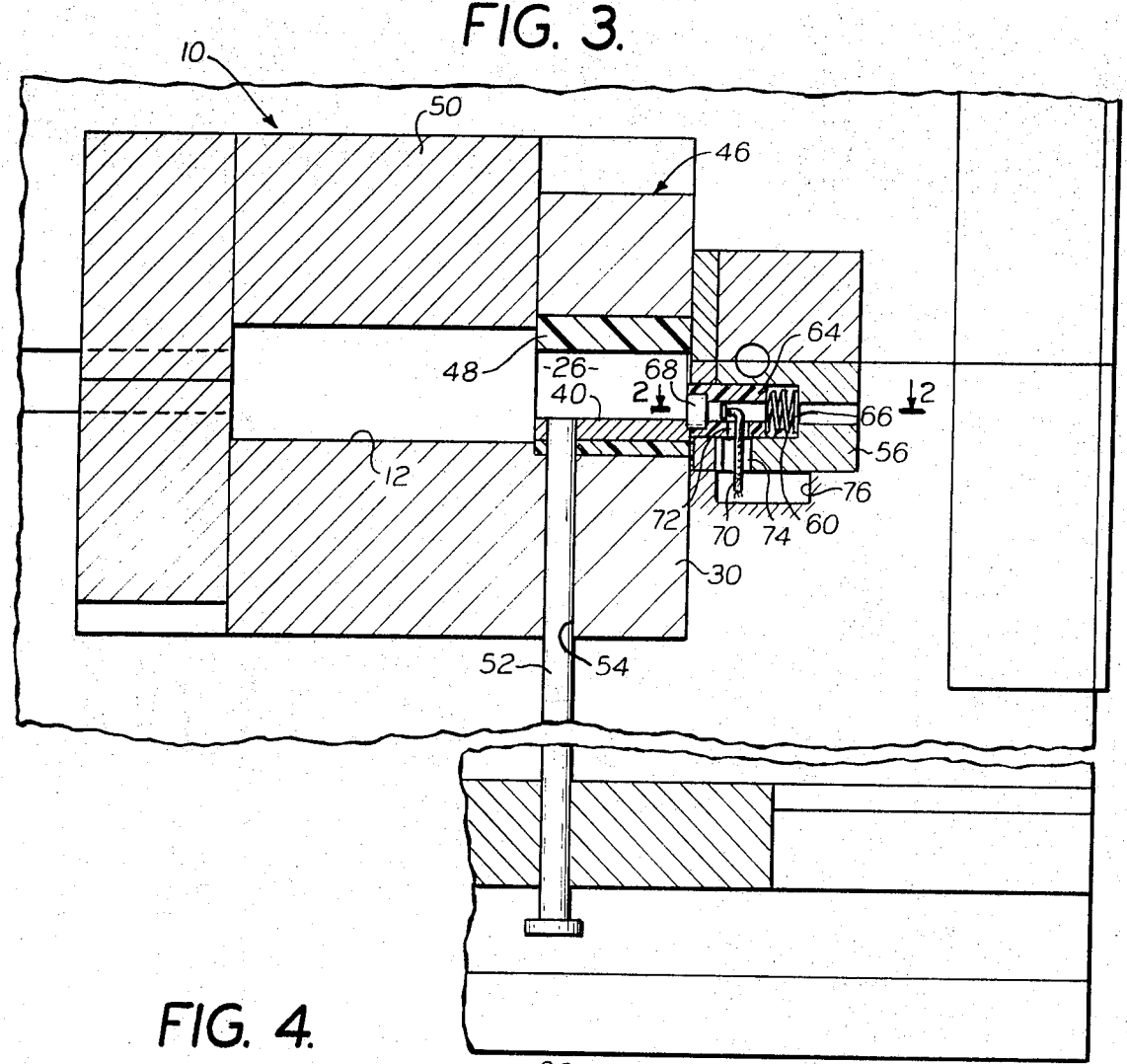
FIG. 3 is a sectional view taken on the line 3—3 of FIG. 1 but showing the upper part of the apparatus which is omitted in FIG. 1.

FIG. 3 shows the way in which the connector element 26 is held down in the slot 40 by a holddown bar 46 which has insulation 48 along its bottom face which contacts with the top of the frame 30 and with the top of the frame 30 and with the upper end of the connector element 26 at any place where there is clearance between the connector element 26 and the insulation 48 of the holddown bar 46. All other connector elements in their respective slots are similarly held in place by the insulated face 48 of the holddown bar 46.

FIG. 3 also shows the upper part of the mold 10. This upper part, designated by the reference character 50, is the movable portion of the mold and the portion which is raised and lowered to open and close the mold cavity 12.

FIG. 3 shows an ejector pin 52 extending upwardly through a guide 54 in the frame 30 under the slot 40. The ejector pin has a diameter not greater than the width of the slot 40 at the location where the ejector pin enters the slot 40; and there are similar ejector pins 52 for all of the slots of the apparatus. These ejector pins are operated in timed relation with the opening of the mold to eject the terminations by thrusting upwardly on the connector elements near the ends of the elements where they enter the molded termination. Ejector pins can also be used for the termination itself, if desired.

On the side of the frame 30 opposite the mold cavities there is a housing 56 which contains sockets, there being a different socket in alignment with each of the slots 38, 40, 38a, 40a and 38b, as shown in FIG. 2. A socket 58 is in line with the slot 38 and a socket 60 is in line with the slot 40. Other sockets 58a, 60a and 58b are in line with the slots 38a, 40aand 38b, respectively.

FIG. 3 shows the construction of the apparatus located in the socket 60. The construction in all of the other sockets is similar. The socket 60 is cylindrical and it contains a sleeve 64 made of electrical insulating material. This sleeve 64 is free to slide axially in the socket 60 and is urged toward the frame 30 by a helical coil spring 66. There is an electrical contact 68 in the end of the sleeve 64. This electrical contact 68 fits into a counterbore in the end of the sleeve and has an extension which fits into the diameter of the sleeve 64. The electrical contact 68 may fit with a press fit in the sleeve 64 or it may be held rigidly in the sleeve by adhesive. The electrical contact 68 moves as a unit with the sleeve 64.

As shown in FIG. 2, the contact 68 is of a diameter slightly wider than the slot 40. If the prong or connector element 26 reaches all the way to the end of the slot 40, or slightly beyond the end of the slot, then the spring 66 will hold the contact 68 against the connector element 26; but if the connector element 26 does not reach all the way to the end of the slot 40, then the spring 66 holds the contact 68 against the uninsulated rearward end of the holder 36 and there is still a circuit from the connector element 26 through the walls of the holder 36 and into the contact 68.

Referring again to FIG. 3, the electrical contact 68 has a conductor 70 connected to its rearward end and this conductor 70 extends through an opening 72 in the side of the sleeve 64. The conductor 70 beyond the contact 68 is insulated and it extends downward through a larger opening 74 in the bottom of the housing 54. This opening 74 is large enough to accommodate for any axial movement of the sleeve 64 which may take place in the operation of the apparatus as a result of the contact 68 being pushed back against the pressure of the spring 66 by connector elements which protrude slightly beyond the slots in which they are held during the molding operation.

The opening 74 opens into a runway 76 in the supporting structure below the housing 54 and this runway 76 is large enough to accommodate conductors 70 from all of the sockets of multicavity mold apparatus.

Figure 4:
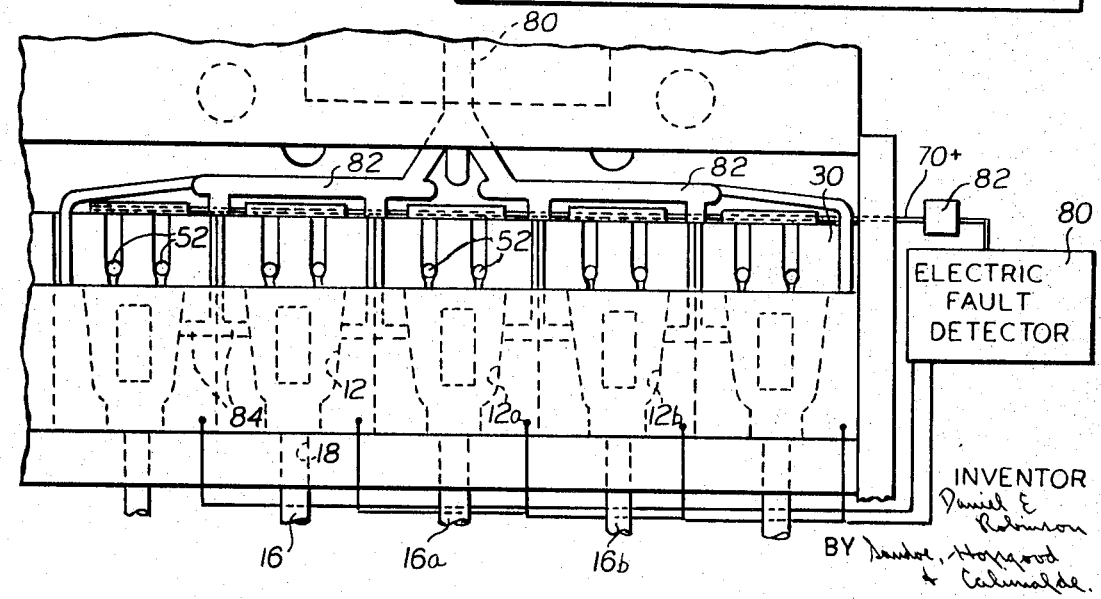
FIG. 4 is a diagrammatic view showing the relation of the cavities of a multicavity mold with the electrically conductive leads to an electronic fault detector and with passages for injecting plastic material into the cavities to form the terminations.

All of the conductors 70, as indicated by the reference character 70+ in FIG. 4, extend beyond the apparatus and lead to an electronic fault detector 80. A switch 82 can be inserted between the fault detector 80 and the multicavity molding apparatus for selectively connecting the different conductors with the electronic fault detector 80, but the selective connections are preferably made automatically by the electronic fault detector itself.

For each termination there are three circuits involved in testing for faults. These circuits are the circuits leading from each of the connector elements of the termination and a circuit leading from the wall of the cavity in which the termination is molded. In the event that there is a defective connection between a multistrand conductor and its connector element, one or more strands may remain loose and form "whiskers" which contact with the wall of the mold cavity after the termination is molded. When there is such a loose whisker in the mold, the entrance of the plastic into the mold may deflect the whisker into contact with the wall of the cavity. A separate conductor from each of the cavity walls is connected selectively with each of the connector elements of the termination to detect a whisker extending through the molded termination.

FIG. 4 is a diagrammatic view showing five cavities of a multicavity mold apparatus and showing diagrammatically a passage 80 and branch passages 82 which lead to smaller passages 84 for supplying plastic to the respective mold cavities. Such multicavity mold apparatus is well known and no further description of it is necessary for a complete understanding of this invention. It will be understood that any suitable molding apparatus can be used for the terminations of this invention, so long as it is designed to permit the location of the holders for the connector elements and the necessary contacts and conductors for establishing separate circuits for detecting faults.

When the invention is applied to molding apparatus for molding terminations which have conducting sockets instead of prongs, projections for holding the connector elements which have the sockets are substituted for the slotted holders of the prongs in the illustrated embodiment of the invention. Different contacts can be used for connecting each connector element with its conduct or leading to the fault detector so long as the principle is maintained of having the circuit from every conductor element insulated from that of every other conductor element and insulated from the walls of the molds in which the terminations are molded. It is desireable that the mold cavities also be insulated from one another, though the fault detector can be designed to operate with a circuit which is common to all of the mold cavity walls, as long as the connector elements are in separate circuits.

The preferred embodiment of the invention has been illustrated and described, and the invention is defined in the appended claims.

What is claimed is:

1. Apparatus for molding a termination on a multiconductor electrical cable which has connector elements at one end thereof joined to the respective conductors within the molded termination, including in combination a mold having a cavity shaped to mold said termination, a holder for each of the connector elements, each holder having electrical contact means in position to establish electrical continuity with a connection element placed at that holder while the termination is being molded, each holder and its electrical contact means being electrically insulated from any other holder and its contact means, and separate leads from the electrical contact means of the holders for establishing a different electric circuit from the connector element each holder to a fault detector.

2. The apparatus described in claim 1 characterized by the holders and their electrical contact means for each of the connector elements being also insulated from the walls of the mold cavity.

3. The apparatus described in claim 1 characterized by the mold being a multicavity mold with an entrance for a different electrical cable at one end of each mold cavity, holders for the connector elements of each cable termination associated with the mold for that termination.

4. The apparatus described in claim 3 characterized by the holders and electrical contact means for each of the mold cavities being also insulated from the holders and electrical contact means of the other mold cavities.

5. The apparatus described in claim 3 characterized by all of the mold cavities having electrically conductive walls and all of the mold cavities being insulated from one another and having conductive circuits for connecting the walls with a fault detector.

6. The apparatus described in claim 5 characterized by the mold cavities being part of an injection mold apparatus, a passage for supplying plastic and branch passages through which plastic for molding the terminations is supplied to all of the mold cavities simultaneously.

7. The apparatus described in claim 1 characterized by the connector elements being blades having portions that are to extend as prongs beyond the end of the termination that is to be molded over the conductors of the cable and over the portions of the blades that are connected to the conductors of the cable, a frame having depressions therein lined with electrical insulation and with said holders held in the insulation, each of the holders being a slotted electrode with its slot in position to receive the prong portion of one of the blades.

8. The apparatus described in claim 7 characterized by a housing on the sides of the electrodes opposite the mold, the electrical contact means being contacts in the housing in contact with the electrodes, each of said contacts being in a different circuit for connecting with a fault detector.

9. The apparatus described in claim 7 characterized by a holddown bar extending across the upper ends of the slots in the electrodes for holding the connector elements down in said slots, the holddown bar being secured to a movable part of the mold and being movable away from the electrodes when the movable part of the molds move into a position to open the mold cavity, the holddown bar including heat-resistant electrical insulation that spans the open upper ends of the slots.

10. The apparatus described in claim 9 characterized by the mold being a multicavity mold with two depressions in the frame and two slotted holders for each mold cavity, the holddown bar extending across all of the slots in the electrodes.

11. The apparatus described in claim 10 characterized by the slotted electrodes having ejector pins in their lower ends extending into the lower ends of the slots for ejecting the prongs from the slotted holders when the mold opens.

12. The apparatus described in claim 1 characterized by the separate lead for each of the holders and its electrical contact means including resilient means holding the electrical contact means against the holder, a housing by which said electrical contact means are carried, a fault detector, and conductor means for connecting each electrical contact means to the fault detector.

13. The apparatus described in claim 12 characterized by a housing having cylindrical sockets therein with one socket for each electrical contact means, a high-temperature insulation sleeve slidable axially in each socket, the electrical contact means being carried by the sleeve at the end of the sleeve which is nearer to its associated holder, the electrical contact means projecting beyond the end of the sleeve and being movable as a unit therewith, an electrical coil spring in each of the cylindrical sockets at the end of the sleeve remote from the electrical contact means and urging the contact means toward its associated holder for firm electrical contact therewith, and a conductor from each electrical contact with insulation around it and extending through an opening in the insulation sleeve and through a larger opening in the housing to a raceway in which the conductors from different contact means extend on their way to the fault detector.

14. The combination with a mold for molding a termination on stranded conductors of a multiconductor cable including, in combination, a mold cavity with an electrically conductive wall that contacts with any loose strand of a stranded conductor which projects through the outside surface of the molded termination at a location where no conductor or strand thereof should be present, electrical contact means electrically insulated from the wall of the mold and in electrical continuity with the intended end portions of the respective conductor cables and a fault detector connected with the wall of the mold cavity and with said contact means.

* * * * *